(12) United States Patent
Loghavi et al.

(10) Patent No.: US 10,953,767 B2
(45) Date of Patent: Mar. 23, 2021

(54) SYSTEM AND METHOD FOR BATTERY-ELECTRIC VEHICLE FLEET CHARGING

(71) Applicant: FORD GLOBAL TECHNOLOGIES, LLC, Dearborn, MI (US)

(72) Inventors: Saeid Loghavi, Novi, MI (US); Seth Loveall, Dearborn, MI (US); Stephanie Singer, Berkley, MI (US); Jennifer Fredericks, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 169 days.

(21) Appl. No.: 16/270,665

(22) Filed: Feb. 8, 2019

(65) Prior Publication Data

US 2020/0254897 A1  Aug. 13, 2020

(51) Int. Cl.
*B60L 53/67* (2019.01)
*G06Q 10/06* (2012.01)
*B60L 53/65* (2019.01)
*B60L 53/68* (2019.01)
*B60L 53/66* (2019.01)
*G06Q 50/06* (2012.01)

(52) U.S. Cl.
CPC .............. *B60L 53/67* (2019.02); *B60L 53/65* (2019.02); *B60L 53/665* (2019.02); *B60L 53/68* (2019.02); *G06Q 10/06315* (2013.01); *G06Q 50/06* (2013.01)

(58) Field of Classification Search
CPC .......... B60L 53/67; B60L 53/65; B60L 53/68; B60L 53/665; G06Q 10/06315; G06Q 50/06; Y02T 90/12; Y02T 10/7072; Y02T 10/70

USPC ......................................................... 320/109
See application file for complete search history.

(56) References Cited

U.S. PATENT DOCUMENTS

| 8,975,866 | B2 * | 3/2015 | McGrath | B60L 53/54 320/109 |
| 9,766,671 | B2 * | 9/2017 | Dorn | B60L 53/65 |
| 10,011,183 | B2 | 7/2018 | Shimizu et al. | |
| 10,076,960 | B2 * | 9/2018 | Ricci | H05K 9/0088 |
| 10,875,412 | B1 * | 12/2020 | MacGregor | E01D 18/00 |

(Continued)

FOREIGN PATENT DOCUMENTS

WO  WO-2014145224 A1 *  9/2014  ............. B60K 16/00

OTHER PUBLICATIONS

J. Arata, M. Leamy and K. Cunefare, "Power-split HEV control strategy development with refined engine transients," SAE Technical Papers, pp. 119-133, Apr. 24, 2012.

(Continued)

*Primary Examiner* — M Baye Diao
(74) *Attorney, Agent, or Firm* — Brooks Kushman PC; David Kelley (57) ABSTRACT

A fleet charging system includes a plurality of chargers. A controller is programmed to predict charge demand for fleet and nonfleet vehicles over a predetermined time interval. The controller generates a charge strategy for the predetermined time interval that minimizes a total energy cost and includes storing energy in the fleet vehicles for sale to the nonfleet vehicles. The controller charges and discharges the fleet and nonfleet vehicles according to the charge strategy.

18 Claims, 5 Drawing Sheets

(56) References Cited

U.S. PATENT DOCUMENTS

| | | | |
|---|---|---|---|
| 2010/0017045 A1* | 1/2010 | Nesler | B60L 53/52 |
| | | | 700/296 |
| 2011/0196692 A1 | 8/2011 | Chavez, Jr. et al. | |
| 2011/0204720 A1 | 8/2011 | Ruiz et al. | |
| 2012/0133337 A1 | 5/2012 | Rombouts et al. | |
| 2012/0330494 A1* | 12/2012 | Hendrix | B60L 53/66 |
| | | | 701/29.3 |
| 2015/0008888 A1* | 1/2015 | Chevalley | B60L 11/1824 |
| | | | 320/137 |
| 2015/0039391 A1* | 2/2015 | Hershkovitz | G06Q 50/30 |
| | | | 705/7.31 |
| 2016/0185251 A1* | 6/2016 | Stefanopoulou | H02J 7/34 |
| | | | 320/101 |
| 2017/0136912 A1* | 5/2017 | Ricci | B60L 53/35 |
| 2018/0012196 A1* | 1/2018 | Ricci | G06F 21/31 |
| 2018/0123391 A1* | 5/2018 | Lakamp | H02J 13/0006 |
| 2018/0307226 A1* | 10/2018 | Chase | B60L 53/68 |
| 2019/0126769 A1* | 5/2019 | Schmalzried | H02J 7/0013 |
| 2020/0254897 A1* | 8/2020 | Loghavi | G06Q 50/06 |

OTHER PUBLICATIONS

Yuan, Z., Teng, L., Fengchun, S., & Peng, H. (2013). Comparative study of dynamic programming and pontryagin's minimum principle on energy management for a parallel hybrid electric vehicle. Energies, 6(4), pp. 2305-2318.

Cai, C., Wong, C., & Heydecker, B. G. (2009). Adaptive traffic signal control using approximate dynamic programming. London: Centre for Transport Studies, University College London.

Wang, F.-Y., Zhang, J., Wei, Q., Zheng, X., & Li, L. (2017). PDP: parallel dynamic programming. IEEE/CAA Journal of Automatica Sinica, 4(1), 1-5.

* cited by examiner

SYSTEM AND METHOD FOR BATTERY-ELECTRIC VEHICLE FLEET CHARGING

TECHNICAL FIELD

This application generally relates to managing charging for a fleet of battery-electric vehicles.

BACKGROUND

Battery-electric vehicles (BEV) have limited range based on the amount of electrical energy that can be stored on-board. The time necessary for recharging a BEV may be much longer than the time for refueling an internal combustion engine (ICE) vehicle. In addition, there is currently less public infrastructure available for recharging BEVs than for refueling ICE vehicles. Such limitations can discourage wide-spread adoption of BEVs to the general public.

SUMMARY

A fleet charging system includes a plurality of chargers. The fleet charging system further includes a controller programmed to predict charge demand and charge time intervals for fleet and nonfleet vehicles, charge fleet vehicles to store energy for sale that exceeds a predicted energy usage for a drive cycle, and discharge the fleet vehicles to satisfy charge demand for nonfleet vehicles to minimize a difference between the energy stored for sale and energy delivered to the nonfleet vehicles.

The controller may be further programmed to throttle a charging rate of the nonfleet vehicles to minimize a difference between energy stored in the fleet vehicles and actual energy delivered. The controller may be further programmed to receive a reservation request for charging from the nonfleet vehicles. The controller may be further programmed to provide an incentive to the nonfleet vehicles for providing a reservation request. The incentive may be a discounted price for electricity provided to the nonfleet vehicle.

A method, performed by a controller, includes predicting energy demand and charge time intervals for fleet and nonfleet vehicles at a charging facility including a plurality of chargers. The method further includes charging fleet vehicles, that are predicted to be coupled to the chargers when a nonfleet vehicle is predicted to be charging according to the predicted charge time intervals, to a level exceeding the predicted energy demand of the fleet vehicles by an amount that is defined by the predicted energy demand for the nonfleet vehicle. The method further includes discharging the fleet vehicles to charge the nonfleet vehicle when connected.

The method may further include charging the fleet vehicles at a time when a cost of electricity from an electrical supplier is less than a cost of electricity when the nonfleet vehicle is predicted to be charging. The method may further include setting a price for energy provided to the nonfleet vehicle that exceeds an amount paid for the energy. The method may further include providing an incentive for nonfleet vehicles to permit throttling of a charging rate to minimize a difference between energy stored in fleet vehicles and energy delivered to the nonfleet vehicle. The method may further include receiving a reservation request for the nonfleet vehicle that includes predicted charge demand and charge time interval for the nonfleet vehicle. The method may further include minimizing a charging cost for fleet vehicles. The method may further include storing energy in fleet vehicles during periods of minimum electricity cost during a predetermined time period and transferring the energy between fleet vehicles during periods at which the electricity cost is greater than the minimum electricity cost. The method may further include generating and evaluating fleet schedules to minimize energy usage of the fleet vehicles.

A fleet charging system includes a plurality of chargers. The fleet charging system further includes a controller programmed to predict charge demand for fleet and nonfleet vehicles over a predetermined time interval, generate a charge strategy for the predetermined time interval that minimizes a total energy cost and includes storing energy in the fleet vehicles for sale to the nonfleet vehicles, and charge and discharge the fleet and nonfleet vehicles according to the charge strategy.

The charge strategy may include charging the fleet vehicles at a time when a cost of electricity from an electrical supplier is minimum. The controller may be further programmed to receive a reservation request for the nonfleet vehicles. The controller may be further programmed to provide an incentive for nonfleet vehicles that permit throttling of a charging rate to minimize a difference between energy stored in fleet vehicles and energy delivered to nonfleet vehicles. The controller may be further programmed to implement a dynamic programming algorithm to minimize the total energy cost for the fleet vehicles. The controller may be further programmed to charge and discharge the fleet vehicles such that an amount of energy stored in each is at least an amount of energy required to complete an upcoming route. The controller may be further programmed to discharge the fleet vehicles to supply energy to the nonfleet vehicles such that the fleet vehicles retain a charge corresponding to a predicted energy usage for each of the fleet vehicles.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Fleet operators may determine that BEVs are an economical choice for fleet vehicles. A fleet operator may provide sufficient charging infrastructure to ensure that fleet transportation needs are satisfied. The fleet operator may construct a charging facility to manage charging for numerous fleet vehicles. For example, a fleet operator may operate vehicles within a predetermined area with respect to a central recharging facility. In addition, fleet vehicles may operate with a predictable schedule within a predetermined time window (e.g., delivery vehicles operating from 9:00 am to 5:00 pm). While fleet vehicles are in use, the charging facility may be underutilized. Fleet owners may be motivated by maximizing utility and profit for operating fleet vehicles. Fleet applications may be affected by various factors including, BEV range limitations, charging time, tiered electric rates, government regulations and incentives, fleet size, and fleet type. These factors may be weighted differently for each fleet operator. Large-scale adaptation of BEVs in fleet applications can play a role in expanding charging infrastructure and promote wider adoption of BEVs for non-fleet consumers.

Figure 1:
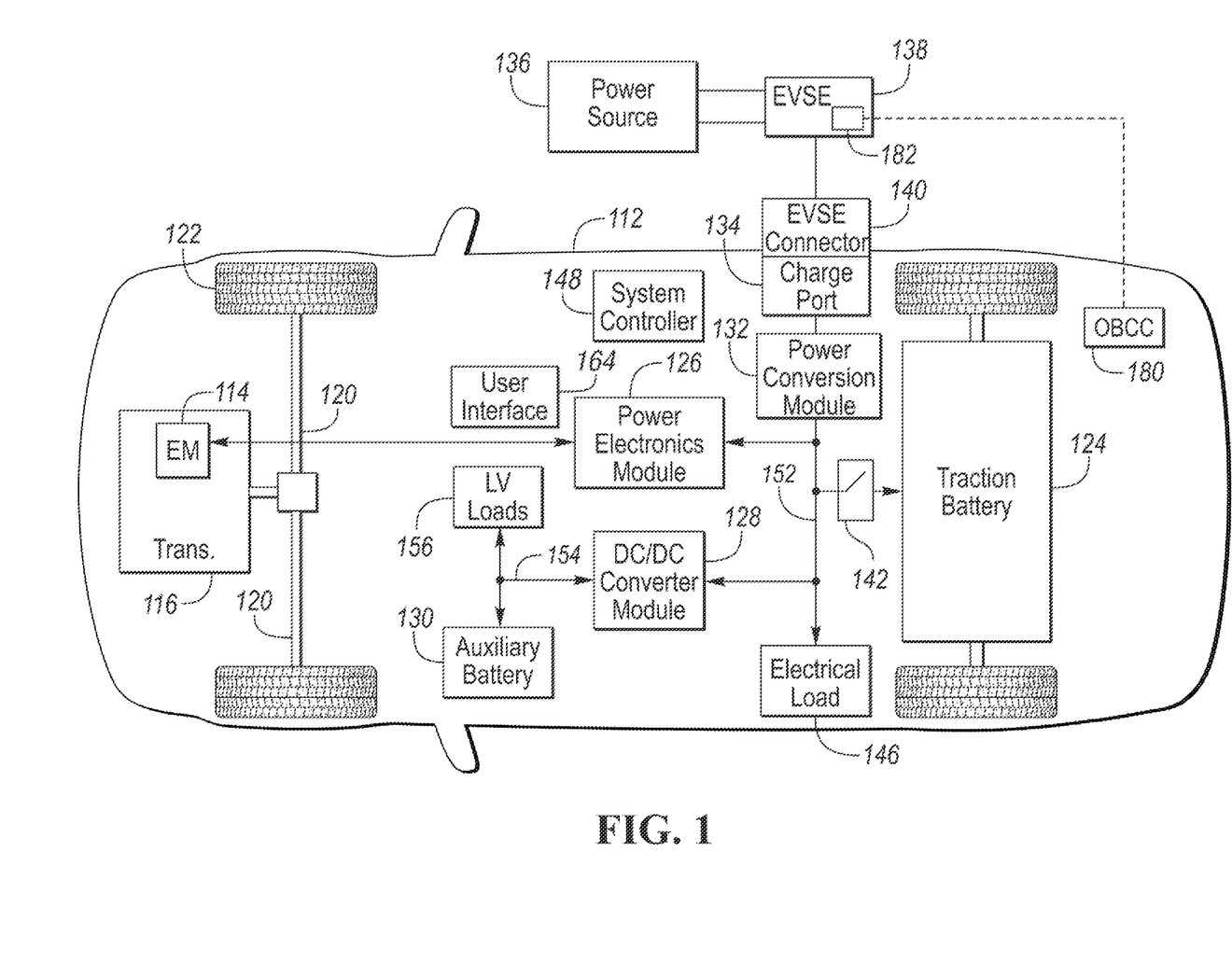
FIG. 1 depicts a possible configuration for an electrified vehicle.

FIG. 1 depicts a possible configuration for a BEV 112. The BEV 112 may comprise an electric machine 114 mechanically coupled to a transmission or gearbox 116. The electric machine 114 may be capable of operating as a motor and a generator. The gearbox 116 may include a differential that is configured to adjust the speed of drive shafts 120 that are mechanically coupled to drive wheels 122 of the vehicle 112. The drive shafts 120 may be referred to as the drive axle. The electric machine 114 may also act as a generator and can provide fuel economy benefits by recovering energy that would normally be lost as heat in a friction braking system.

A battery pack or traction battery 124 stores energy that can be used by the electric machine 114 for propulsion. The traction battery 124 may provide a high voltage direct current (DC) output. A contactor module 142 may include one or more contactors configured to isolate the traction battery 124 from a high-voltage bus 152 when opened and connect the traction battery 124 to the high-voltage bus 152 when closed. The high-voltage bus 152 may include power and return conductors for carrying current over the high-voltage bus 152. The contactor module 142 may be integrated with the traction battery 124. One or more power electronics modules 126 may be electrically coupled to the high-voltage bus 152. The power electronics module 126 is also electrically coupled to the electric machine 114 and provide the ability to bi-directionally transfer energy between the traction battery 124 and the electric machine 114. For example, a traction battery 124 may provide a DC voltage while the electric machine 114 may operate with a three-phase alternating current (AC) to function. The power electronics module 126 may convert the DC voltage to a three-phase AC current to operate the electric machine 114. In a regenerative mode, the power electronics module 126 may convert the three-phase AC current from the electric machine 114 acting as a generator to the DC voltage compatible with the traction battery 124.

In addition to providing energy for propulsion, the traction battery 124 may provide energy for other vehicle electrical systems. The vehicle 112 may include a DC/DC converter module 128 that converts the high voltage DC output from the high-voltage bus 152 to a low-voltage DC level of a low-voltage bus 154 that is compatible with low-voltage loads 156. An output of the DC/DC converter module 128 may be electrically coupled to an auxiliary battery 130 (e.g., 12V battery) for charging the auxiliary battery 130. The low-voltage loads 156 may be electrically coupled to the auxiliary battery 130 via the low-voltage bus 154. One or more high-voltage electrical loads 146 may be coupled to the high-voltage bus 152. The high-voltage electrical loads 146 may have an associated controller that operates and controls the high-voltage electrical loads 146 when appropriate. Examples of high-voltage electrical loads 146 may be a fan, an electric heating element and/or an air-conditioning compressor.

The electrified vehicle 112 may be configured to recharge the traction battery 124 from an external power source 136. The external power source 136 may be a connection to an electrical outlet. The external power source 136 may be electrically coupled to a charge station or electric vehicle supply equipment (EVSE) 138. The external power source 136 may be an electrical power distribution network or grid as provided by an electric utility company. The EVSE 138 may provide circuitry and controls to regulate and manage the transfer of energy between the power source 136 and the vehicle 112. The external power source 136 may provide DC or AC electric power to the EVSE 138. The EVSE 138 may have a charge connector 140 for coupling to a charge port 134 of the vehicle 112. The charge port 134 may be any type of port configured to transfer power from the EVSE 138 to the vehicle 112. The charge port 134 may be electrically coupled to an on-board power conversion module 132. The on-board power conversion module 132 may condition the power supplied from the EVSE 138 to provide the proper voltage and current levels to the traction battery 124 and the high-voltage bus 152. The on-board power conversion module 132 may interface with the EVSE 138 to coordinate the delivery of power to the vehicle 112. The EVSE connector 140 may have pins that mate with corresponding recesses of the charge port 134. Alternatively, various components described as being electrically coupled or connected may transfer power using a wireless inductive coupling.

Electronic modules in the vehicle 112 may communicate via one or more vehicle networks. The vehicle network may include a plurality of channels for communication. One channel of the vehicle network may be a serial bus such as a Controller Area Network (CAN). One of the channels of the vehicle network may include an Ethernet network defined by Institute of Electrical and Electronics Engineers (IEEE) 802 family of standards. Additional channels of the vehicle network may include discrete connections between modules and may include power signals from the auxiliary battery 130. Different signals may be transferred over different channels of the vehicle network. For example, video signals may be transferred over a high-speed channel (e.g., Ethernet) while control signals may be transferred over CAN or discrete signals. The vehicle network may include any hardware and software components that aid in transferring signals and data between modules. The vehicle network is not shown in FIG. 1, but it may be implied that the vehicle network may connect to any electronic module that is present in the vehicle 112. A vehicle system controller (VSC) 148 may be present to coordinate the operation of the various components. Note that operations and procedures that are described herein may be implemented in one or more controllers. Implementation of features that may be described as being implemented by a particular controller is not necessarily limited to implementation by that particular controller. Functions may be distributed among multiple controllers communicating via the vehicle network.

The vehicle 112 may include an onboard charge controller (OBCC) 180 that is configured to manage charging of the traction battery 124. The OBCC 180 may be in communication with other electronic modules to manage the charging operation. For example, the OBCC 180 may communicate with controllers associated with the traction battery 124 and/or power conversion module 132. In addition, the OBCC 180 may include an interface for communicating with the EVSE 138. For example, the EVSE 138 may include a communication interface 182 for communicating with vehicles. The communication interface 182 may be a wireless interface (e.g., Bluetooth, WiFi) or may be a wired interface via the EVSE connector 140 and charge port 134.

The traction battery 124 may be characterized by various operating parameters. A charge capacity of the traction battery 124 may indicate the amount of energy that the traction battery 124 may store. A state of charge (SOC) of the traction battery 124 may represent a present amount of energy stored in the traction battery 124. The SOC may be represented as a percentage of a maximum amount of energy that may be stored in the traction battery 124. The traction battery 124 may also have corresponding charge and discharge power limits that define the amount of power that may be supplied to or by the traction battery 124 at a given time. The OBCC 180 may implement algorithms to estimate and/or measure the operating parameters of the traction battery 124.

Figure 2:
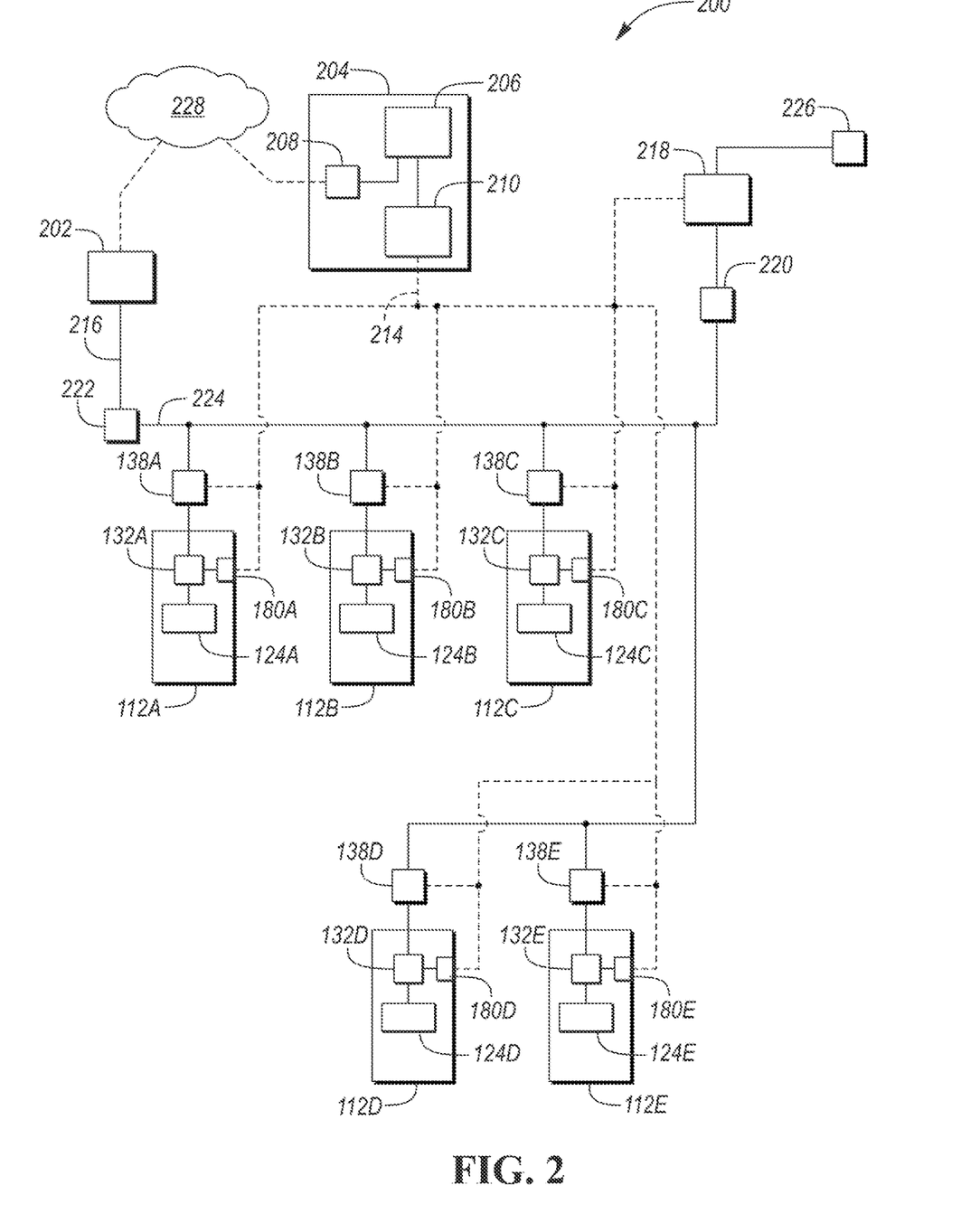
FIG. 2 depicts a possible configuration for a vehicle charging system.

FIG. 2 depicts a possible configuration of a fleet charging system 200 for charging a fleet of vehicles that includes publicly accessible charge stations. The fleet charging system 200 may include a connection to a utility power source 202. The utility power source 202 may provide electricity that is transferred to the fleet charging facility via one or more transmission lines 216. The transmission lines 216 may be electrically coupled to a distribution box 222 that may be located at the fleet charging facility. The distribution box 222 may be configured to receive electricity from the transmission lines 216 and distribute the electricity to a local charging system power grid 224. The local charging system power grid 224 may be comprised of conductors for routing electricity within the fleet charging facility. The distribution box 222 may include one or more transformers for scaling electricity from the transmission lines 216 to the local charging system power grid 224.

The local charging system power grid 224 may be configured to provide power to one or more chargers/charge stations 138 (or EVSE as previously described). The charge stations 138 may be configured to charge one or more electrified vehicles 112 that are connected to the charge stations 138. The charge stations 138 may also be configured to receive power from the vehicles 112 and transfer the power to the local charging system power grid 224. A vehicle may be connected to the charge stations 138 when the charge connector 140 is coupled to the charge port 134. In wireless charging configurations, a vehicle may be connected when a receive coil of the vehicle is aligned with a transmit coil of the charge station 138. The vehicles 112 may include a traction battery 124. The vehicles 112 may include an on-board power conversion module 132 (or power conversion module as previously described). The vehicles 112 may include an onboard charge controller 180 to manage charging and discharging of the traction battery 124 from the charge station 138.

The fleet charging system 200 may include one or more energy storage devices 218. The energy storage devices 218 may be batteries or battery systems that are located on-site. The energy storage devices 218 may be electrically coupled to one or more alternative energy generators 226. The alternative energy generators 226 may include alternative sources of energy such as wind and/or solar energy generators. Energy created by the alternative energy generator 226 may be stored in the energy storage devices 218 for later use. A power converter 220 may be electrically coupled between the energy storage devices 218 and the local charging system power grid 224. The power converter 220 may be configured to convert energy to the proper specifications depending on the direction of power flow. For example, the power converter 220 may convert electrical energy from the energy storage devices 218 to a form compatible with the local power grid 224. In this direction, the power converter 220 may convert DC power to AC power. For power flow in the opposite direction, the power converter 220 may convert AC power to DC power. The energy storage devices 218 may also receive power from the local charging system power grid 224.

The fleet charging system 200 may include a fleet management controller 204. The fleet management controller 204 may include a processing unit 206 that is configured to execute one or more programs or tasks for managing operation of the fleet charging system 200. The fleet management controller 204 may further include volatile and non-volatile memory for storing programs and data. The fleet management controller 204 may include a vehicle and charge station network interface 210 to establish a first communication network 214. The charge stations 138 and vehicle 112 may be configured to communicate via the first communication network 214 by wired and/or wireless interfaces. The vehicle and charge station network interface 210 may be configured to exchange data between the processing unit 206 and the charge stations 138 and onboard charge controllers 180. The vehicle and charge station network interface 210 may include wired and wireless interfaces. For example, the interface to the charge stations 138 may be wired, while the interface to the onboard charge controllers 180 may be wireless.

The fleet management controller 204 may include an external communication interface 208 that is configured to communicate to an external network or cloud 228 (e.g., the Internet). The external communication interface 208 may be an Ethernet (wired and/or wireless) interface that is configured to access the external network 228. The processing unit 206 may communicate with the utility power source 202 via the external network 228. The utility power source 202 may be configured to communicate with the external network 228. For example, the utility power source 202 may be configured to transfer electricity cost information via the external network 228. The electricity cost information may include a rate schedule for electricity.

The electric utility may supply electricity at different prices depending on market conditions. For example, when electricity demand is high, the electric utility may provide electricity at a relatively high price to discourage use. Also, when electricity demand is high, the electric utility may pay to receive electricity from the fleet charging system 200. The fleet charging system 200 may be configured to transfer power from the energy storage devices 218 and vehicle traction batteries 124 to the transmission lines 216. When electricity demand is low (e.g., late at night), the utility may provide electricity at a relatively low price. In some situations, the electric utility may pay users to use electricity. Such conditions could occur when there is excess supply on the grid with little remaining energy storage capacity.

The fleet charging system 200 may be configured to provide a number of charge stations 138. The number of charge stations 138 may define the number of vehicles 112 that may be charged at the same time. The fleet charging system 200 may be configured to be expandable such that charge stations 138 may be added later if demand changes.

The vehicles 112 may be distinguished by ownership and/or purpose. For example, some of the vehicles 112 (e.g., 112A, 112B, and 112C) may be owned and/or operated by the owner/operator of the fleet charging facility 200. Such vehicles may be referred to as fleet vehicles. Some of the vehicles 112 (e.g., 112D and 112E) may be owned and/or operated by persons not associated with the fleet charging facility 200 (e.g., public users). Such vehicles may be referred to as nonfleet vehicles. The vehicles 112 may include a traction battery 124 and onboard charge controller 180. Each of the vehicles 112 may have different battery capacities, charge/discharge power limits, and states of charge. Each traction battery 124 may have a different operating range depending on the specific configuration. The OBCC 180 of each vehicle 112 may communicate battery specific parameters to the fleet management controller 204. Each vehicle 112 may also have different system efficiencies. The system efficiency may comprehend the different loss characteristics within the electrified powertrain. Efficiency may be affected by properties of the electric machines, power modules, and gearboxes. The efficiency may define the effectiveness at which energy is transferred through the system.

The charge stations 138 may be distinguished by access. For example, some charge stations (e.g., 138A, 138B, and 138C) may be accessible only to the fleet vehicles. These charge stations may be located in a secure location to which only the fleet vehicles have access (e.g., garage, fenced parking lot with controlled access). Some charge stations (e.g., 138D and 138E) may be publicly accessible. In some configurations, the charge stations 138 may be used by both fleet and non-fleet vehicles 112. The proportion of private and public charge stations may vary based on the configuration.

The fleet charging system 200 may be configured to operate the charge stations 138 to maximize utility and profit for the facility/fleet operator. For example, the facility operator may benefit from charging fleet vehicles (e.g., 112A, 112B, 112C) at a minimum possible cost. Further, the facility operator may desire that the fleet vehicles are sufficiently charged to complete a route (e.g., drive cycle) and return to the facility without running out of energy. Operation of the fleet charging system 200 may be impacted by various factors including range limitations of the vehicles, charging time for the vehicles, tiered electric rates, government regulations/incentives, and size and type of the fleet. The fleet management controller 204 may receive parameters associated with these factors.

The fleet charging system 200 may be configured to maximize utility, reduce costs, and maximize revenue for the facility owner/operator. A vehicle manufacturer that can provide a system to manage the charging facility that achieves these goals may benefit as well. For example, such a system may lead to increased vehicle sales to the fleet operator. The fleet charging system 200 may incorporate an energy-based model of fleet vehicles and nonfleet vehicles and utilize optimization algorithms to minimize charging costs and maximize vehicle utility. The energy-based model may incorporate vehicle schedules and tiered electric rates. The fleet management controller 204 may be programmed to implement the energy-based model and optimization algorithms.

The fleet charging system 200 may be configured to maximize utility by using under-utilized vehicles stored in the fleet parking lot to store energy for future use. An under-utilized vehicle may be a vehicle that is not regularly used for fleet purposes (e.g., a spare or extra vehicle). An under-utilized vehicle may also be a vehicle that does not require charging to the full battery storage capacity to complete a drive cycle. The under-utilized vehicles may include extra battery storage capacity that can be utilized to transfer energy to other fleet vehicles, the utility, and/or to external customer vehicles. The control strategy may ensure that each vehicle is charged to a predetermined level prior to a scheduled departure time. The predetermined level may be an SOC level, including a reserve amount, that allows the vehicle to complete an expected route or drive cycle. The utilization of the fleet vehicles may be determined from a deployment schedule maintained by the fleet operator. The utilization of fleet vehicles may also be determined by a learning algorithm that observes arrival and departures of the fleet vehicles from the facility. The charging control strategy may be implemented by the fleet management controller 204.

Onsite energy storage devices 218 and fleet vehicles may be charged when electricity rates are favorable and sold at a higher price to the grid operator and/or external customers using the charging stations 138. Facilities having onsite alternative energy generators 226 may utilize a scheduling system to minimize dependence on the utility power source 202 and store energy for later use. An optimization algorithm may be used for cost-benefit analysis to provide a quantifiable and objective analysis for comparing the operational cost of different vehicles in the fleet and to investigate the cost-benefit of adding or upgrading on-site energy storage devices, alternative energy generators, and/or charging stations.

The fleet charging system 200 may be configured to maximize revenue to the facility owner by allowing public use of the charging stations 138 at fleet parking areas. Revenue may be generated by opening the charging stations 138 for charging personal vehicles. Profit may be maximized by charging fleet vehicles and energy storage devices 218 when electricity prices are low and selling the stored energy at a higher price. The fleet charging system 200 may be configured to use predictive algorithms to predict the number and schedule of external customers using the charging stations 138. The predictive algorithms may provide input to the scheduling algorithms for choosing energy storage options. The energy storage options may be selected to minimize the difference between the energy stored in the energy storage devices and the actual energy delivered to external customers. The predictive algorithms may minimize the lost opportunity to generate profit due to underestimating or overestimating the energy demand by external customers. Revenue may be further maximized by providing incentives to external customers. The incentives may include a discounted price for electricity. For example, discounts may be provided for reserving a charge station in advance. The fleet charging system 200 may include a web interface that is accessed via the external network 228 to manage input of reservations from nonfleet vehicle operators. Reservations may allow the fleet charging system 200 to more accurately plan in advance and store energy at the lowest cost. Discounts and/or incentives may be provided for permitting the charging rate for nonfleet vehicles to be throttled in order to minimize the difference between the energy stored for sale and the actual energy delivered.

The fleet charging system 200 may be configured to minimize the charging cost for fleet vehicles. The fleet management controller 204 may implement a globally optimal control system for the charging infrastructure. Charging costs may be minimized by charging fleet vehicles with the lowest cost electricity and/or offsetting electricity costs by sales to nonfleet vehicles. The fleet charging system 200 may be configured to store energy in under-utilized fleet vehicles and other onsite energy storage devices. The fleet charging system 200 may use the stored energy to charge vehicles that are using the charging facility during times of peak electric rates. A dynamic programming algorithm may be implemented by the fleet management controller 204 to determine the optimal charging control strategy. The fleet charging system 200 may take advantage of tiered-rate electricity schedules and vehicle deployment schedules to minimize the charging cost. The dynamic programming algorithm may consider factors such as system efficiency and charge/discharge limits (e.g., to prevent thermal damage). The fleet charging schedule may be affected by a predicted external customer schedule and energy demand. The onsite energy storage devices 218 may be incentivized to store more energy prior to arrival times of external customers. External customers may be incentivized to select slow/fast charging in order to maximize fleet operator revenue by fully utilizing cheap electricity stored in the energy storage devices and minimize fleet energy demand during periods of high electricity prices.

The fleet charging system 200 provides an incentive for fleet customers to increase investment in charging infrastructure. An increase in charging infrastructure may increase the adaptation of electric vehicles in the marketplace. The fleet charging system 200 can generate additional revenue for fleet operators by encouraging fleet operators to make charge stations publicly available. The fleet charging system 200 fleet charging system 200 can generate additional revenue for fleet operators by opening charging stations to individual customers when not in use by fleet vehicles. The fleet charging system 200 may also be used to forecast the operation of the fleet vehicles and compare different vehicles/charging devices under consideration for fleet expansion. The fleet charging system 200 may also be used to evaluate different fleet schedules in order to optimize fleet operation. In addition, the fleet charging system 200 may predict non-fleet vehicle schedules and incorporate this knowledge into the optimization.

The fleet charging system 200 may be configured to permit power flow between vehicles 112 without using the transmission lines 216 and/or utility power source 202. As such, a power path is utilized between the vehicles 112 and energy storage devices 218 that are connected to the charge stations 138. This allows power to be transferred between storage elements without using power grid resources. The configuration permits transfer of power between vehicles during periods of high electric rates.

The fleet management controller 204 may implement a dynamic programming (DP) algorithm. Bellman's Principle of Optimality states that the optimality of a future control action is not affected by any past control input. DP uses this principle to progress backwards in time through a predetermined schedule having identified states and control variables and provides an optimal control path within the constraints of the control space.

The DP algorithm may be used on a class of discrete-time models of the following form:

$$x_{k+1} = F_k(x_k, u_k), k=[0, N-1] \quad (1)$$

where k denotes the index of discretized time, $x_k$ denotes the state variable, $u_k$ denotes the control variable, and $F_k$ denotes the function defining the state variable. In addition, for application of DP, the state and control variables are discretized.

The total cost of employing the control strategy $\pi = \{u_0, u_1, \ldots u_{N-1}\}$ with the initial state $x_0$ is defined by:

$$J_{0,\pi}(x_{=0}0) = g_0(x_0) + g_N(x_N) + \phi_N(x_N) + \Sigma_{k=0}^{N-1}[h_k(x_k, u_k) + \phi_k(x_k, u_k)] \quad (2)$$

where $J_{0,\pi}(x_0)$ represents the total cost, $g_0(x_0)$ and $g_N(x_N)$ represent the cost of the initial and final steps respectively, $\phi_k(x_k, u_k)$ is the penalty function enforcing the constraints on the state and control variables, and $h_k(x_k, u_k)$ is the incremental cost of applying the control at time k. The optimal control path is one that minimizes the total cost represented in Equation (2).

The DP algorithm adapted for the case of fleet vehicles may be implemented in any programming language as a backward-looking simulation in which vehicles parked at a fleet parking lot are charged following a predetermined departure schedule and tiered electric rate schedule. The algorithm may also incorporate nonfleet vehicles based on a predicted schedule. In addition, nonfleet vehicle owners may be encouraged to reserve a charging station in advance which can aid in the prediction process. Battery state of charge (SOC) may be calculated assuming constant power flow at each time step. The main advantage of implementing a backward-looking simulation is the faster computation time, which comes at the cost of overlooking energy due to transient effects.

The DP control problem of the electrified fleet vehicles is characterized as:

$$x_i = (SOC_i), i=1,2,3, \ldots, n \quad (3)$$

$$u_i = (V_i, A_i) \quad (4)$$

$$h_k = \text{rate}_e(x, u) \quad (5)$$

where $\text{rate}_e$ is the cost of electric energy, $SOC_i$ is the battery state of charge (SOC) for the $i_{th}$ vehicle in the fleet, and $V_i$ and $A_i$ refer to charging/discharging voltage and current at each time step for the $i_{th}$ vehicle.

The DP algorithm applied to the fleet seeks to minimize the forward electric cost at any point of discretized state-time space. This minimizing operation is summarized as:

$$J_k(SOC_k^i) = \min[J_{k+1}(SOC_{k+1}^i) + \text{rate}_e + \phi_k] \quad (6)$$

The system design constraints, based on the operational limit of each component, may be summarized as:

$$\text{Fleet Component capability constraints}: \begin{cases} V_{i,min}(SOC_i) \leq V_i \leq V_{i,max}(SOC_i) \\ A_{i,min}(SOC_i) \leq A_i \leq A_{i,max}(SOC_i) \\ (SOC_i, T_i)P_{i,min} \leq P_i \leq P_{i,max}(SOC_i, T_i) \end{cases} \quad (7)$$

where $P_i$ and $T_i$ refer to the charging/discharging power and a core temperature of the traction battery in vehicle i. Choices of control outside of the range specified in equation (7), may result in the application of a large penalty term.

In order to prevent excessive cycling of the traction batteries 124 in the vehicles 112, a charge sustaining constraint may be imposed on vehicle i until the simulation time is within a predetermined number of time steps from a scheduled departure. The following constraint may be applied:

$$SOC_{i,min} \leq SOC_i \leq SOC_{i,max} \tag{8}$$

using the penalty term described in Equation (6). The penalty terms may be several orders of magnitude larger than the incremental cost of using electricity. If a control choice results in a SOC for vehicle i outside of the specified range as in Equation (8), then a large penalty term may be applied; otherwise, the penalty terms may be set to zero.

The DP algorithm may attempt to drive the SOC for each of the vehicle traction batteries 124 to a desired value at a predetermined time. The desired value may be an SOC level that is sufficient to provide a predetermined range for the next drive cycle or upcoming route. The predetermined time may be an expected departure time. The range and departure time may be determined from the fleet schedule. For non-fleet vehicles, the range and departure time may be predicted values or based on reservation data. Each of the vehicles may have a different schedule with different range and time requirements. The system may also incorporate expected arrival times to the charging facility.

The DP algorithm may be configured to represent a predetermined time interval. The DP algorithm may be configured to provide the charging strategy for the predetermined time interval. The choice of the predetermined time interval may depend on the particular fleet application. A longer time interval may be subject to changing conditions but may yield more optimal results. A shorter time interval may result in less optimal results but may be better suited to highly varying conditions.

The DP algorithm may be executed with a variety of parameters. For example, a fleet operator may add vehicles or charge stations and simulate the results. Vehicle parameters such as battery capacity may also be changed and modeled. The DP algorithm can provide feedback on how system changes affect costs of the charging facility. The DP algorithm can provide valuable feedback to the fleet operator for evaluating changes that can make the fleet charging system more cost effective. By varying the simulation parameters, the fleet operator can make decisions that result in lower costs or increased revenue.

Figure 3:
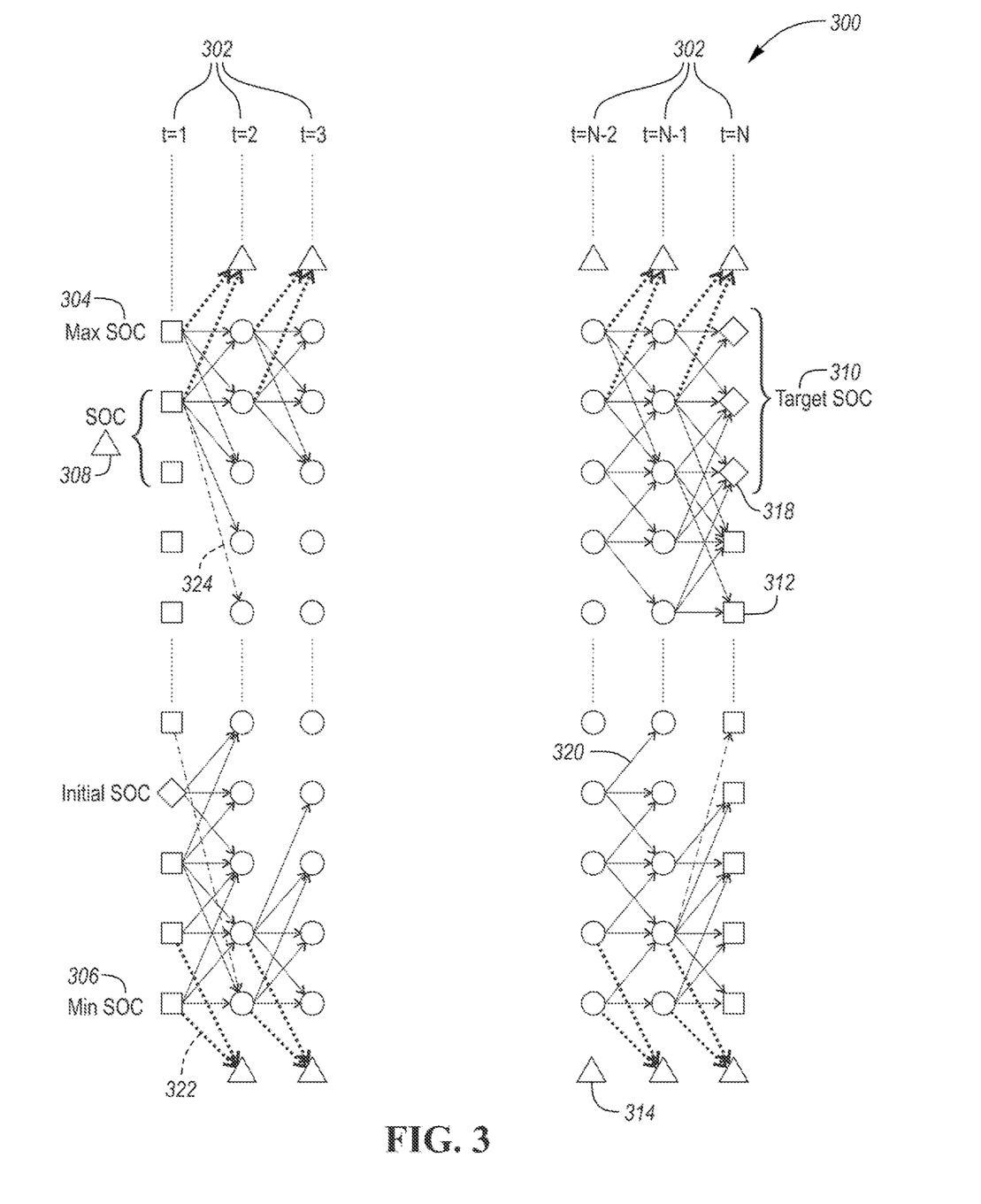
FIG. 3 depicts a visual representation of calculating incremental cost and penalty terms.

FIG. 3 provides a visual representation 300 of calculating incremental cost and penalty terms. From left to right, each column 302 represents all possible state of charge options (SOC) at a specific time step. SOC values in the initial (e.g., t=1) and final time steps (e.g., t=N), shown as squares 312, may be assigned large penalty terms to ensure the optimal control path starts from a predetermined initial SOC and ends with a sufficiently-charged battery. SOC values represented by squares 312 may be assigned a high penalty term to ensure the optimal control path does not result in over charging or complete discharge of the battery. Target SOC values may be represented as diamonds 318 in the rightmost column of the table. SOC values in the time steps that are outside of the SOC limits, shown as triangles 314, may be assigned a high penalty term. SOC values shown as circles 316 may have no associated penalty terms. For example, some SOC values may be greater than a Maximum SOC 304 or less than a minimum SOC 306. A SOC delta 308 may define the SOC difference between adjacent SOC levels.

Arrows shown in FIG. 3 display the incremental and penalty cost associated with different control choices. Solid arrows 320 represent allowable control choices, each assigned with a unique incremental cost, which is a function of power flow, while dashed arrows 324 represent control choices that violate discharge/charge power limits and dotted arrows 322 represent control choices that violate SOC limits. In the application of DP, at each time step, all possible control choices for each discretized value of the state variable (SOC) are evaluated and the control choice with the minimum cost is stored. The optimal control path is described by control choices associated with the discretized value of state with the minimum cost at each time step.

One of the main limitations in the application of DP, referred to as the curse of dimensionality, describes the computational limitations caused by the requirement to evaluate the objective function for each combination of state variables. There have been extensive studies in the application of different adaptations of DP such as, Approximate Dynamic Programming (ADP) and Parallel Dynamic Programming (PDP), in order to reduce computational costs. Similar adaptions of DP can reduce the computational cost and significantly reduce the simulation time.

It should also be noted that system dynamics may dictate the choice of the simulation time step. For example, the adaption of DP to analyze hybrid electric vehicle architecture and the optimal power flow between the electric machine and engine, features an example with fast system dynamics. In comparison, the application of DP to the system described herein features slower system dynamics. Taking advantage of the slow system dynamics, the simulation time steps can be reduced with limited impact on the choice of optimal control strategy and therefore may significantly reduce computational cost.

The fleet management controller 204 may implement predictive algorithms for determining the charging schedule for the vehicles 112. The predictive algorithm may be configured to learn an expected energy demand for fleet and non-fleet vehicles. Energy demand for fleet vehicles may be derived from a fleet schedule. The fleet schedule may define the departure and arrival of fleet vehicles from the charging facility. The fleet schedule may define the trip distance and an estimate of energy required for the trip for each of the fleet vehicles. Further, the fleet management controller 204 may predict the energy demand and schedule based on past fleet vehicle operation. For example, the fleet management controller 204 may monitor arrival and departure times of the fleet vehicles by monitoring the removal and connection of the fleet vehicles to the charge stations 138. Based on this information, the fleet management controller 204 may manage the charging for each of the fleet vehicles such that enough energy is stored to complete the trip. The algorithm may include a margin to ensure that more energy is stored than is needed to accommodate route, weather, and/or traffic variations.

The predictive algorithm may further be configured to learn or predict an expected energy demand for non-fleet vehicles. Non-fleet vehicles may not have a known arrival and/or departure time. As such, the energy usage may be learned over time to ensure that enough lowest-cost energy is available. The fleet management controller 204 may predict the operation of non-fleet vehicles based on past charging history. The fleet management controller 204 may store charging history data for non-fleet vehicles that have previously charged at the location. In some configurations, the non-fleet vehicles may be able to reserve a charge station at a predetermined time. Non-fleet scheduling requests may be used to determine the energy storage requirements for the energy storage devices and fleet vehicle traction batteries to accommodate the non-fleet vehicles at a later time. The predictive algorithm may also predict non-fleet vehicle energy demand based on location of the charging facility and time of day. For example, a charging facility that is located near a downtown area having active nightlife establishments may predict a higher non-fleet vehicle energy demand in the evenings/nighttime. A charging facility located near an office park may predict a higher non-fleet vehicle energy demand during normal working hours.

The predictive algorithms may assign incentives for storing additional energy in the fleet energy storage system for sale to non-fleet vehicles. The algorithm may incorporate intermediate SOC targets and times to accommodate an energy transfer at a later time. This may be implemented by changing penalties within the DP algorithm. For example, a predicted energy demand for non-fleet vehicles may cause traction batteries of the fleet vehicles to be charged to a higher level to ensure energy is available for non-fleet vehicles. A larger penalty term may be applied to solutions that do not satisfy this condition. The fleet charging system 200 may associate a cost or penalty to deviations from energy demand by non-fleet vehicles as determined by the predictive algorithm. The DP algorithm may include penalty terms for any imbalance between the predicted energy demand for non-fleet vehicles and the actual energy that is stored for sale to non-fleet vehicles.

The predictive algorithms may predict the number and schedule of non-fleet vehicles using the facility. The predicted schedule and number of non-fleet vehicles may influence the optimization algorithm by throttling the charging rate for non-fleet vehicles to maximize utility of each charging station. Throttling the charging rate may include decreasing the rate of charging of the vehicles. Throttling may occur when the number of non-fleet vehicles is expected to be less than the number of charging stations. The throttling may occur when the current electric rate for power supplied from the grid is high compared to electric rates at a future time. Throttling may also be used to match the charging rate with the discharging rate of the energy storage devices. The optimization algorithm may associate a penalty for a higher charging rate. The penalty may be reduced when more non-fleet vehicles are expected to use the charging station and/or the electric rate from the grid is reduced.

The predictive algorithm may consider the expected charging duration and total energy for each customer vehicle by associating an incentive to store additional energy in onsite storage devices during periods of low electric rates that cannot be delivered to non-fleet vehicles before the electric rate increases. For example, non-fleet vehicles that are expected to join the charging system before the electric rate increases but cannot be fully charged using cheaper electricity. In other examples, vehicles may be predicted to arrive at times of increased electricity cost. In such cases, it may be beneficial to charge energy storage devices with lower cost electricity and transfer the energy when rates are increased.

The predictive algorithm may be periodically executed to predict charge demand and schedules for fleet and nonfleet vehicles over a predetermined time interval. The predetermined time interval may be a time interval in the future. The schedules may include predicted arrival and departure times and predicted energy demand for each of the vehicles. The dynamic programming algorithm may be periodically executed using the predicted energy demand and vehicle schedules generated by the predictive algorithms. The fleet management controller 204 may be programmed to execute the dynamic programming algorithm to generate a charge strategy for the predetermined time interval that minimizes a total energy cost. The charge strategy may include storing energy in the fleet vehicles for sale to the nonfleet vehicles. The fleet management controller 204 may cooperate with the onboard charge controllers 180 to charge and discharge the fleet and nonfleet vehicles according to the charge strategy.

Figure 4:
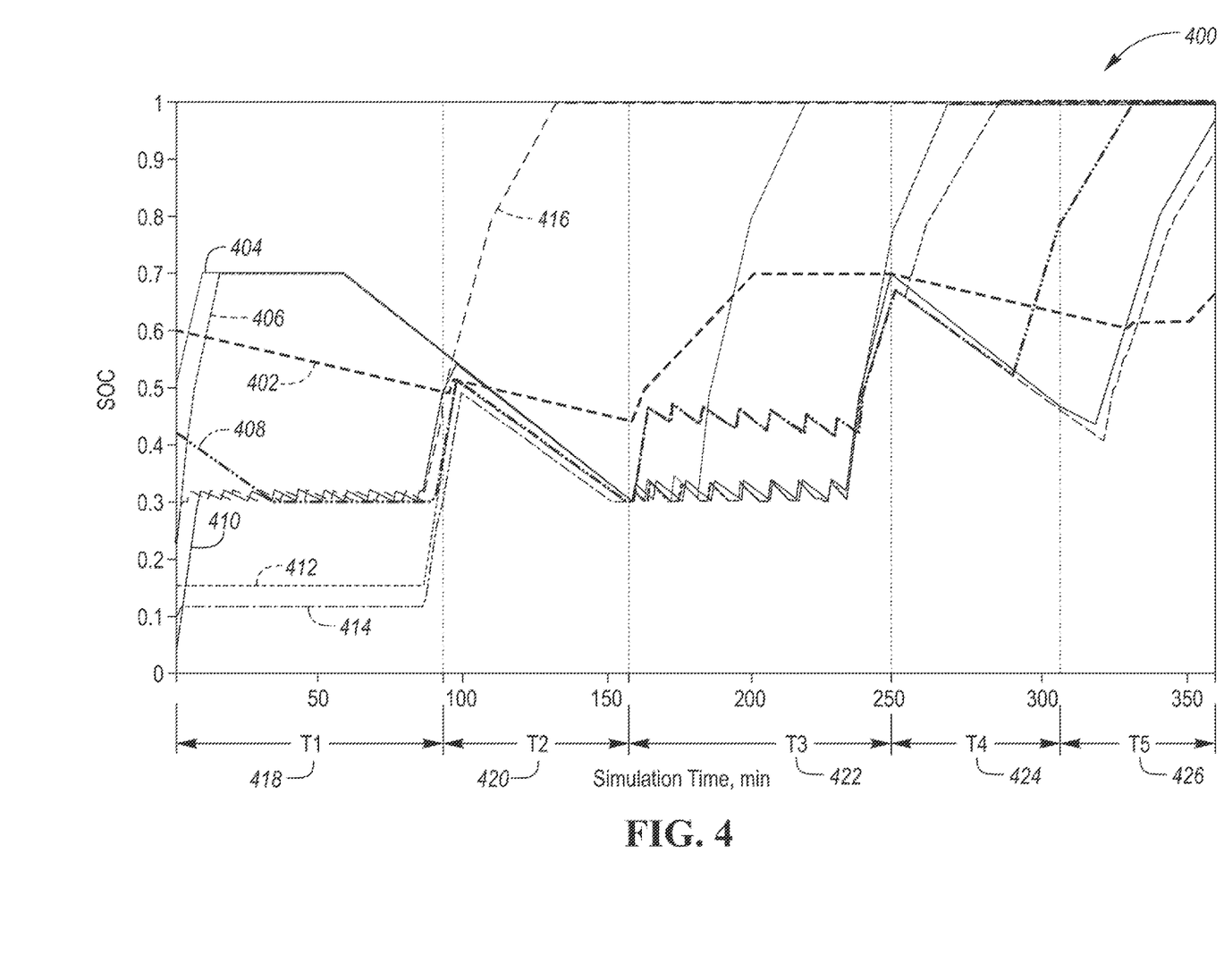
FIG. 4 depicts a plot of a possible charging strategy for a fleet of vehicles coupled to the vehicle charging system.

FIG. 4 depicts a plot 400 of a simulation for charging a fleet of seven vehicles and an on-site storage device. The electric rate schedule and vehicle deployment schedule is known. During a first time period T1 418, an electric rate of $0.28 per kWh is applied. During a second time period T2 420, an electric rate of $0.03 per kWh is applied. During a third time period T3 422, the electric supplier pays $0.15 per kWh for electricity usage. During a fourth time period T4 424, an electric rate of $0.28 per kWh is applied. During a fifth time period T5 426, an electric rate of $0.03 per kWh is applied. The electric rate during the first time period T1 418 and the fourth time period T4 424 may be considered a high electric rate. The electric rate during the second time period T2 420 and the fifth time period T5 426 may be considered a low electric rate.

The simulation example depicts that all vehicles are connected to the charging stations at time zero. However, the application of the optimization function is not limited as such. The traction batteries in the vehicles may have different capacities and starting SOC values. In this example, the goal may be to achieve full charge at deployment time which is less than the simulation end time. The simulation also operates the on-site energy storage device in a charge sustaining mode in which the initial SOC and the final SOC are the same. The simulation may attempt to maintain the SOC of the vehicle batteries within 30%-70% until a predetermined time before the deployment time. The charging rate may be limited based on the SOC. For example, charging may be performed at a maximum charging rate when the SOC is less than 50%. Charging may be performed at a low charging rate when SOC is greater than 80%. Between 50% and 80%, a medium charging rate may be applied.

Trace 402 represents the SOC of an on-site energy storage device having capacity of 60 kWh and an initial SOC of 60%. Trace 404 represents the SOC of a first vehicle having a capacity of 15 kWh, an initial SOC of 50%, and a deployment time of 180 minutes. Trace 406 represents the SOC of a second vehicle having a capacity of 14 kWh, an initial SOC of 20%, and a deployment time of 234 minutes. Trace 408 represents the SOC of a third vehicle having a capacity of 20 kWh, an initial SOC of 42%, and a deployment time of 252 minutes. Trace 410 represents the SOC of a fourth vehicle having a capacity of 18 kWh, an initial SOC of 3%, and a deployment time of 360 minutes. Trace 412 represents the SOC of a fifth vehicle having a capacity of 20 kWh, an initial SOC of 12%, and a deployment time of 360 minutes. Trace 414 represents the SOC of a sixth vehicle having a capacity of 20 kWh, an initial SOC of 10%, and a deployment time of 288 minutes. Trace 416 represents the SOC of a seventh vehicle having a capacity of 18 kWh, an initial SOC of 22%, and a deployment time of 90 minutes.

The simulation example charges each vehicle to a full SOC level before vehicle departure. However, the SOC level of each vehicle before departure may be selected as a lower value. For example, the SOC level may be set to an SOC level that can satisfy the drive cycle and include a predetermined margin for error.

The DP algorithm seeks to minimize the cost associated with the optimal control choice. For example, the high electric rate in T1 418 for charging may outweigh the penalty terms applied to the fifth vehicle corresponding to trace 412 and the sixth vehicle corresponding to trace 414 which have an initial SOC below the minimum 30% SOC threshold (as described in Equation (8)). The relatively high electric rate during the first time period T1 418 may also encourage vehicles and any on-site storage devices to send stored energy to the power grid for a profit. Vehicles may be penalized when discharged below 30% SOC and therefore it may prevent deep discharge of the vehicle traction battery. As the vehicle SOC reaches 30%, the penalty term may incentivize the vehicle to start charging, however as the vehicle SOC increases above 30% the high electric rate may incentivize the vehicle to send stored energy to the grid for a profit. The shift between the incentive to discharge battery for a profit and the penalty to prevent deep discharge, which occurs at exactly 30% SOC, may cause a vehicle to go through multiple charge and discharge cycles, as the fourth vehicle corresponding to trace 410 and the seventh vehicle corresponding to trace 416 depict multiple charge and discharge cycles during the first time period T1 418. This type of behavior may be avoided by either applying a higher discretization level to the control and state spaces, or by gradual application of the deep discharge penalty such that a small penalty is incurred for the first time at 30% SOC and the penalty increases as the battery is discharged further.

The optimization algorithm results in a 111% reduction in charging cost compared to fully charging the fleet vehicles starting from time zero (e.g., basic charging strategy). The optimal charging solution takes advantage of time periods in which the electric supplier pays for using electricity, resulting in a net profit. The simulation result depicts the optimal charge profile for each of the vehicles given the set of parameters. The simulation can be performed with different parameters to explore the effect of parameter changes.

Figure 5:
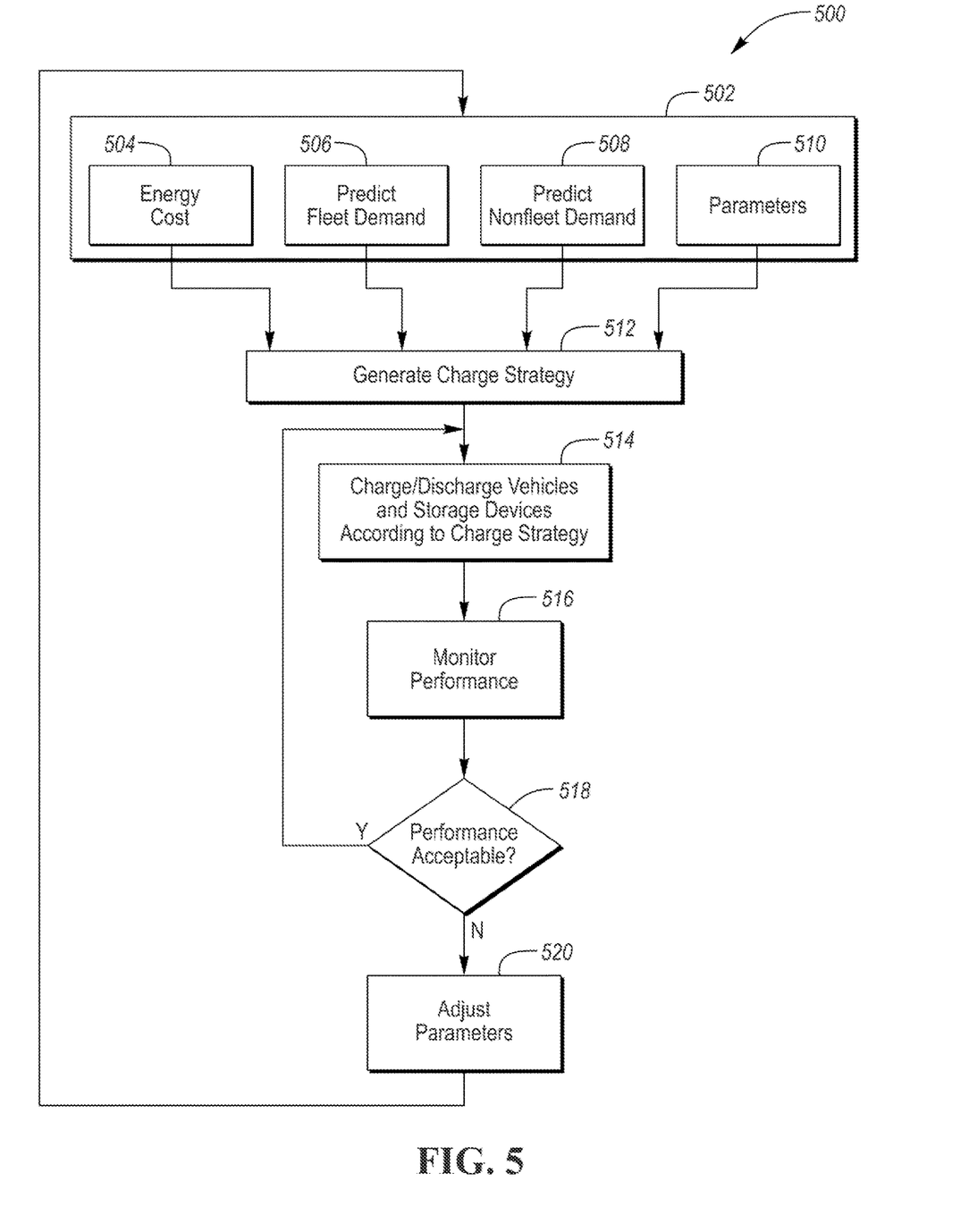
FIG. 5 depicts a flowchart of a possible sequence of operations for a fleet charging system.

FIG. 5 depicts a flow chart 500 for a possible sequence of operations that may be implemented in the fleet management controller 204. An optimization setup phase 502 may include operations that provide inputs to the optimization algorithm. The operations of the optimization setup phase 502 may be implemented in parallel and/or may be performed at various times as corresponding inputs change.

At operation 504, energy costs may be determined. For example, a rate schedule from the utility may be requested and/or received. In addition, the associated cost for local energy generation equipment may be determined.

At operation 506, energy demands and schedules for fleet vehicles may be predicted. The fleet vehicle energy demand and charge time intervals may be predicted based on a fleet schedule that includes departure and arrival times and energy requirements for the drive cycle. The information may be entered by the fleet operator and/or may be learned over time as the fleet vehicles are charged.

At operation 508, energy demands and schedules for nonfleet vehicles may be predicted. The nonfleet vehicle energy demand and charge time intervals (e.g., schedule) may be determined from reservation requests that have been received. In addition, the nonfleet vehicle demand may be learned over time based on previous charging history data.

At operation 510, optimization parameters may be determined. The optimization parameters may include penalty terms for the DP algorithm. The optimization parameters may include parameters such as battery capacity for onsite energy storage devices.

At operation 512, the charge strategy for a time interval may be generated. The time interval may be comprised of a sequence of time segments. For example, the time interval may be divided into time segments of one minute. The charge strategy may be generated by executing the dynamic programming algorithm. The charge strategy may minimize the total energy cost. The charge strategy may include storing energy in the fleet vehicles for sale to the nonfleet vehicles. When possible, the charge strategy may store energy in fleet vehicles during periods of minimum electricity cost. Nonfleet vehicles may be charged a price that is greater than the minimum electricity cost. The charge strategy may cause fleet vehicles to be charged to a level exceeding a predicted energy demand/usage of the fleet vehicles by a total amount that is at least a predicted energy demand for a nonfleet vehicle. The charge strategy may include a charge/discharge schedule for each of the vehicles. The charge/discharge schedule may include the charge/discharge power for each vehicle over each time segment of the time interval.

At operation 514, the fleet and nonfleet vehicles may be charged and discharged according to the charge strategy. The vehicles may be operated by communicating the charge/discharge power for each time segment to each of the vehicles. The OBCC of each vehicle may charge/discharge the traction battery according the provide charge/discharge power for each time segment.

At operation 516, the performance of the system may be monitored. For example, the system may check to ensure that each charge/discharge power command is being followed. The system may determine if the charge/discharge power command cannot be followed (e.g., vehicle not connected). The system may further determine the cost impact of the command not being followed.

At operation 518, a check may be performed to determine if performance is acceptable. Performance may be acceptable if each vehicle is present and operating according to the charge strategy. If the performance is acceptable, the system may continue executing the charge strategy. Performance may not be acceptable if the cost impact exceeds a threshold. If the performance is not acceptable, operation 520 may be performed.

At operation 520, the charging parameters may be adjusted to reflect the actual conditions. The optimization setup phase 502 may be performed with the updated parameters so that a new charge strategy may be computed. Examples of changing parameters may include vehicles not arriving or not departing at approximately the scheduled times. Other examples, may include unexpected arrival or demand from nonfleet vehicles. In addition, vehicle or charge station issues may arise that impact the charge strategy. For example, an inoperable charge station may result in a vehicle not being able to charge or discharge. In such cases, it may be desirable to regenerate the charge strategy with the new constraints.

The charging strategy minimizes total energy cost and/or maximizes revenue for the fleet operator. The system also provides a way for the fleet operator to analyze the impact of changes to the vehicles and/or the fleet charging system. The charging strategy is capable of handling fleet and nonfleet vehicles to maximize revenue and/or reduce cost for the fleet operator. By providing benefits to the fleet operator, the system may encourage the fleet operator to make some charging stations available to the public.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A fleet charging system comprising:
a plurality of chargers; and
a controller programmed to predict charge demand and charge time intervals for fleet and nonfleet vehicles, charge fleet vehicles to store energy for sale that exceeds a predicted energy usage for a drive cycle, and discharge the fleet vehicles to satisfy charge demand for nonfleet vehicles to minimize a difference between the energy stored for sale and energy delivered to the nonfleet vehicles.

2. The fleet charging system of claim 1, wherein the controller is further programmed to throttle a charging rate of the nonfleet vehicles to minimize a difference between energy stored in the fleet vehicles and actual energy delivered.

3. The fleet charging system of claim 1, wherein the controller is further programmed to receive a reservation request for charging from the nonfleet vehicles.

4. The fleet charging system of claim 3, wherein the controller is further programmed to provide an incentive to the nonfleet vehicles for providing a reservation request.

5. The fleet charging system of claim 4, wherein the incentive is a discounted price for electricity provided to the nonfleet vehicle.

6. A method comprising:
by a controller,
receiving a reservation request for the nonfleet vehicle that includes predicted charge demand and charge time interval for the nonfleet vehicle;
predicting energy demand and charge time intervals for fleet and nonfleet vehicles at a charging facility including a plurality of chargers;
charging fleet vehicles, that are predicted to be coupled to the chargers when a nonfleet vehicle is predicted to be charging according to the predicted charge time intervals, to a level exceeding the predicted energy demand of the fleet vehicles by an amount that is defined by the predicted energy demand for the nonfleet vehicle; and
discharging the fleet vehicles to charge the nonfleet vehicle when connected.

7. The method of claim 6 further comprising charging the fleet vehicles at a time when a cost of electricity from an electrical supplier is less than a cost of electricity when the nonfleet vehicle is predicted to be charging.

8. The method of claim 7 further comprising setting a price for energy provided to the nonfleet vehicle that exceeds an amount paid for the energy.

9. The method of claim 6 further comprising providing an incentive for nonfleet vehicles to permit throttling of a charging rate to minimize a difference between energy stored in fleet vehicles and energy delivered to the nonfleet vehicle.

10. The method of claim 6 further comprising minimizing a charging cost for fleet vehicles.

11. The method of claim 6 further comprising storing energy in fleet vehicles during periods of minimum electricity cost during a predetermined time period and transferring the energy between fleet vehicles during periods at which the electricity cost is greater than the minimum electricity cost.

12. The method of claim 6 further comprising generating and evaluating fleet schedules to minimize energy usage of the fleet vehicles.

13. A fleet charging system comprising:
a plurality of chargers; and
a controller programmed to predict charge demand for fleet and nonfleet vehicles over a predetermined time interval, generate a charge strategy for the predetermined time interval that minimizes a total energy cost and includes storing energy in the fleet vehicles for sale to the nonfleet vehicles, and charge and discharge the fleet and nonfleet vehicles according to the charge strategy, wherein the controller is further programmed to discharge the fleet vehicles to supply energy to the nonfleet vehicles such that the fleet vehicles retain a charge corresponding to a predicted energy usage for each of the fleet vehicles.

14. The fleet charging system of claim 13, wherein the charge strategy includes charging the fleet vehicles at a time when a cost of electricity from an electrical supplier is minimum.

15. The fleet charging system of claim 13, wherein the controller is further programmed to receive a reservation request for the nonfleet vehicles.

16. The fleet charging system of claim 13, wherein the controller is further programmed to provide an incentive for nonfleet vehicles that permit throttling of a charging rate to minimize a difference between energy stored in fleet vehicles and energy delivered to nonfleet vehicles.

17. The fleet charging system of claim 13, wherein the controller is further programmed to implement a dynamic programming algorithm to minimize the total energy cost for the fleet vehicles.

18. The fleet charging system of claim 13, wherein the controller is further programmed to charge and discharge the fleet vehicles such that an amount of energy stored in each is at least an amount of energy required to complete an upcoming route.

\* \* \* \* \*